United States Patent [19]

Smith

[11] Patent Number: 4,999,480

[45] Date of Patent: Mar. 12, 1991

[54] HOLDER WITH AUTOMATIC TIMED SHUT-OFF FOR LARGE TIPPED-ELECTRIC SOLDERING IRONS

[75] Inventor: David R. Smith, Jefferson County, Colo.

[73] Assignee: Soldering Tool Reconditioning, Inc., Denver, Colo.

[21] Appl. No.: 318,735

[22] Filed: Mar. 3, 1989

[51] Int. Cl.⁵ .......................... H05B 1/02; B23K 3/08
[52] U.S. Cl. .................... 219/242; 219/228; 219/240; 219/247; 228/57; 248/117.2
[58] Field of Search ............... 219/242, 231, 228, 246, 219/259; 228/51-55, 57; 248/117.1-117.7

[56] References Cited

U.S. PATENT DOCUMENTS

| | | | |
|---|---|---|---|
| 880,871 | 3/1908 | Fell | 248/117.2 |
| 1,540,959 | 6/1925 | Schumacker | 219/242 UX |
| 2,174,230 | 9/1939 | Shangle | 219/242 UX |
| 2,355,883 | 8/1944 | Mathews | 219/242 X |
| 2,494,840 | 1/1950 | Stephenson | 219/231 |
| 2,527,435 | 10/1950 | Little et al. | 248/117.7 |
| 2,543,103 | 2/1951 | Friesen | 219/242 |
| 3,327,981 | 6/1967 | Yates | 219/242 X |
| 3,649,809 | 3/1972 | Halstead | 219/228 |
| 4,243,875 | 1/1981 | Chang | 219/492 |
| 4,418,268 | 11/1983 | Munshaw | 219/242 |

Primary Examiner—Anthony Bartis
Attorney, Agent, or Firm—James R. Young

[57] ABSTRACT

A soldering iron holder for holding an electric. Soldering iron having a large square tip at the end of a barrel, such as an iron that is used with surface mounted integrated circuits, has a base with a shield attached to a depressible mounting rod that extends through the upper surface of the base. The shield has a large frontal opening and mounted inside the shield, offset to one side, is a bracket with a side facing slot. The large opening allows a soldering iron with a large tip to be inserted into the shield, then moved sideways to insert the barrel of the iron into the slot of the bracket. When the iron is inserted into the slot, it depresses the shield which activates a weight switch connected to the base of the mounting rod. Activating the weight switch starts a timer that removes power from the iron if the iron remains in the holder for a long period of time. Also disclosed is a spring clip that may be attached to the slot in the bracket to aid in inserting the barrel of the iron into the slot.

17 Claims, 3 Drawing Sheets

HOLDER WITH AUTOMATIC TIMED SHUT-OFF FOR LARGE TIPPED ELECTRIC SOLDERING IRONS

BACKGROUND OF THE INVENTION

This invention relates to electrical heating apparatus and more particularly to hand-held electrical heating apparatus such as soldering irons. Even more particularly, this invention relates to a holder for such soldering irons.

As integrated circuits get larger and larger, and particularly with the advent of surface mounted integrated circuits, soldering irons capable of handling these types of devices have become more sophisticated. To handle the larger, square, integrated circuits and surface mounted integrated circuits, the tips on these soldering irons have a large surface area while the barrel between the handle and the tip remains long and slender. Traditional soldering irons have a handle, a barrel to conduct heat to the tip, and a slender, pointed, tip. Using this type of iron, integrated circuits must be soldered or un-soldered one pin at a time. Irons capable of soldering large square integrated circuits and surface mounted integrated circuits must solder, or un-solder, all pins of the integrated circuit at once. To accomplish this, the tips of these irons have a surface that is similar in shape and size to the integrated circuit. Consequently, the tip is much larger than the barrel, and oftentimes even larger than the handle of the soldering iron. Also, because of the requirements for soldering surface mounted integrated circuits, and the tips have a very short lifetime.

Conventional soldering iron holders consist of a base, sometimes including the power supply for the soldering iron, and a vertical slot on top to hold the iron. With this type of holder the iron is exposed, allowing anyone near the iron to easily touch the hot iron. The exposure problem has been solved for the 15 conventional soldering iron with a shield consisting of a coil of heavy wire having a center opening into which the iron is inserted. This coil is mounted at about a 45 degree angle with respect to the base and the center opening is larger than the barrel and tip, but smaller than the handle. This allows the tip of the iron to be inserted into the coil, while the handle stays outside the coil. The iron is in such a position that it can easily be grasped in the same manner the user would grasp a pencil. The iron is typically turned on and off by a switch mounted on the base.

The large square tip of an iron for soldering surface mounted devices causes a problem with the conventional holder. Since this tip is much larger than the barrel, and often larger than the handle, the conventional wire coil holder is not satisfactory. If the center opening is large enough for the square tip, it is too large to hold the handle, and the iron falls to the bottom of the coil where it is cooled rapidly, or where it might be damaged. Also, with so large a center opening, the tip can easily touch the shield and quickly be cooled far below the desired soldering temperature, thus causing the user to have to wait for the iron to reheat each time it is to be used.

The problem of short tip life has been addressed by the device of U.S. Pat. No. 4,418,268 issued Nov. 29, 1983 to Munshaw. This device provides two vertical slots to hold a conventional soldering iron. The handle rests in a first slot, and the barrel of the iron rests in a second slot. Alongside the second slot is a detector, consisting of a light source and photocell, used to detect the presence of the iron. A circuit connected to this detector removes power from the iron when the iron has been in the holder for a predetermined period of time. This device has several disadvantages, however. First, there is no shield around the tip of the iron to prevent someone from touching the hot tip. Secondly, the iron is held in a horizontal position, and the holder contacts the handle of the iron, so it is difficult for a user to grasp the iron when it is in the holder. That is, soldering irons are most often used while being held like a pencil, so after grasping the iron while it is in the holder of the Munshaw device, a user must shift the position of the iron in their hand to a usable position, and when replacing the iron, the user must shift the iron's position again before it can be inserted back into the holder. A more convenient holder would allow a user to place and remove the iron while holding it like a pencil. Another disadvantage of the Munshaw device is that the detector is very close to the iron so it is subject to deterioration from the heat of the iron and therefore more likely to fail. Having the sensor close to the iron also requires that connecting wires be placed near the iron causing assembly problems and deterioration. Because of the way the holder of this device is constructed, if a shield were placed around the iron, the iron would be difficult to insert and remove from the holder. This problem would be exacerbated if the iron had a large square tip.

It is thus apparent that there is a need in the art for a soldering iron holder that allows an iron having a large square tip to be inserted in the holder, and provides a shield around the tip while keeping the tip from touching the shield. There is a further need in the art for such a holder that will remove power from the soldering iron after it has been in the holder for a long time, so as to preserve tip life, but which also has a long lasting sensor. A further need in the art is for such a holder that allows the soldering iron to be held in a position that is convenient for a user to grasp the iron the way they would hold a pencil. Yet another need is for such a holder that has a shield that can easily be removed for cleaning and replacement.

SUMMARY OF THE INVENTION

It is an object of the present invention to provide a soldering iron holder for irons with a large square tip, wherein a shield surrounds the tip when the iron is in the holder.

It is another object of the present invention to provide a soldering iron holder with a vertical bracket mounted inside the shield, such bracket having a horizontal slot that allows a soldering iron having a large tip to be held in the slot without touching the shield.

A still further object is to provide a weight switch connected to the shield to detect the presence of the iron, such switch being located a sufficient distance from the tip of the iron to remain undamaged by the heat from the tip.

Another object of the present invention is to provide a soldering iron holder that keeps the iron in a position that allows a user to easily grasp the iron handle in a manner similar to holding a pencil.

Another object of this invention is to provide a soldering iron present switch that does not require connecting wires to be extended into the shield.

Another object of the present invention is to allow the shield to be removable.

These and other objects of the present invention are accomplished by a soldering iron holder that has a rectangular base and a power supply. A shield is attached to a rod that is slidably attached to the base and extends into the base to contact a weight switch. A pair of vertical brackets are mounted inside the shield, but offset from the center of the shield. Slots are formed horizontally in each of these brackets, and the two slots are aligned to allow the barrel of a soldering iron to fit in both slots at the same time. A soldering iron having a large square tip, such as an iron used to solder or un-solder surface mounted integrated circuits, is inserted into the shield on the side opposite the brackets, and then moved horizontally into the slots in the brackets. The brackets then keep the iron from falling down into the shield, or back out of the shield, and they also keep the tip of the iron from contacting the shield.

Because the shield is attached to the base by the rod, the shield can easily be removed for cleaning or replacement. Also because the rod is slidably attached to the base, the shield can move vertically. Inserting the iron increases the weight of the shield displacing the rod downward to close the weight switch. This closure activates a timer circuit that will remove power from the iron after a predetermined period of time. When the iron is removed from the shield, a spring moves the shield away from the base and the switch is deactivated, causing the timer to be reset. In this manner, the iron will automatically shut off if left unused for a long period of time, but will continue to heat if used periodically.

Two brackets with slots are used to give sufficient width to the slot to hold the iron in place, however, a single bracket that is sufficiently wide would also hold the iron in place.

One modification of the invention provides a funnel shaped spring clip attached to the bracket, or the forward bracket of the two brackets, to guide the iron into the slots as it is being inserted.

BRIEF DESCRIPTION OF THE DRAWINGS

The above and other objects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

The general principle of the present invention is to provide a soldering iron holder that will hold a soldering iron having a large square tip at the end of a barrel, such as an iron that is used with surface mounted integrated circuits. The device has a base and a shield attached to a mounting rod that extends through the upper surface of the base. The shield has a large frontal opening and mounted inside the shield, offset to one side, are two brackets with side facing slots. The large opening allows a soldering iron with a large tip to be inserted into the shield, then moved sideways to insert the barrel of the iron into the slots of the brackets. When the iron is inserted into the slots, it depresses the shield which activates a weight switch connected to the base of the mounting rod. Activating the weight switch starts a timer that removes power from the iron if the iron remains in the holder for a long period of time.

Figure 1:
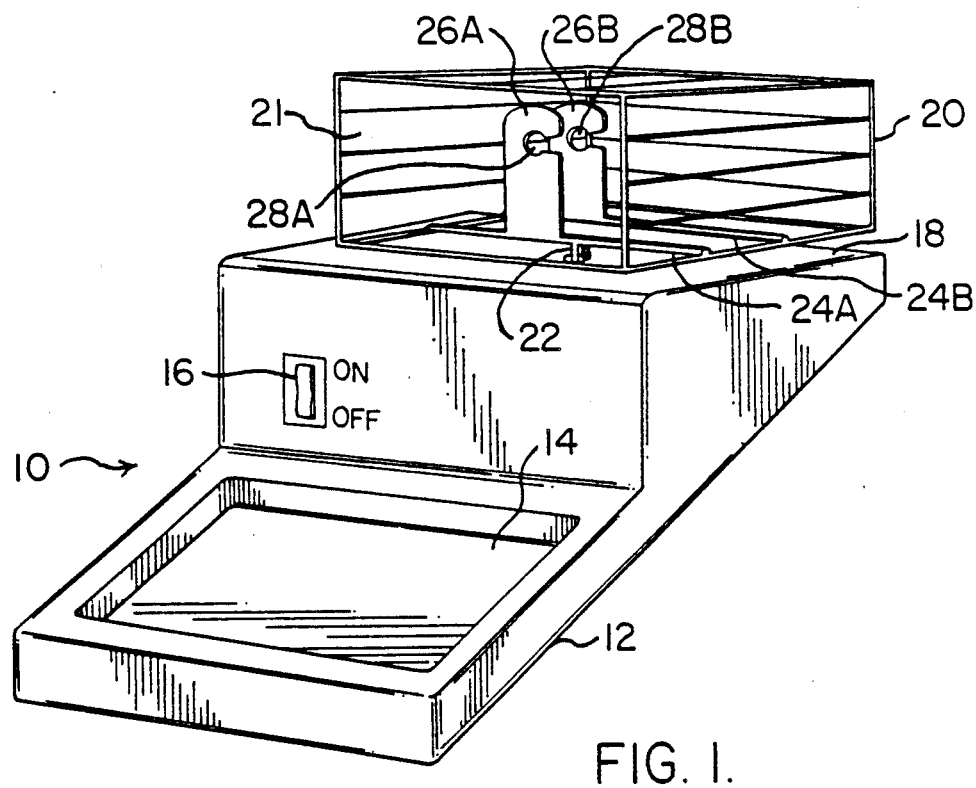
FIG. 1 is a perspective view of the soldering iron holder of the present invention.

Referring now to FIG. 1, a perspective view of the soldering iron holder 10 is shown. A base 12 has a well 14 for holding a sponge used to clean the soldering iron during use. Attached to the base 12 is a switch 16 which is used to apply or remove electrical power from the soldering iron. A shield 20 is attached through a horizontal bar 24A to a rod 22 which extends through an upper surface 18 of the base 12. The rod 22 is slidably mounted to the base to allow the shield 20 to move vertically with respect to the base 12. Also attached to the horizontal bar 24A is a bracket 26A having a slot 28A formed therein. A second bracket 26B, having a slot 28B formed therein, is attached to a second horizontal bar 24B. As will be shown in a later figure, the slots 28A and 28B are used to hold a barrel of a soldering iron. The brackets 26A and 26B are mounted off center inside the large frontal opening 21 of the shield 20 to allow room to insert the large tip.

Figure 2:
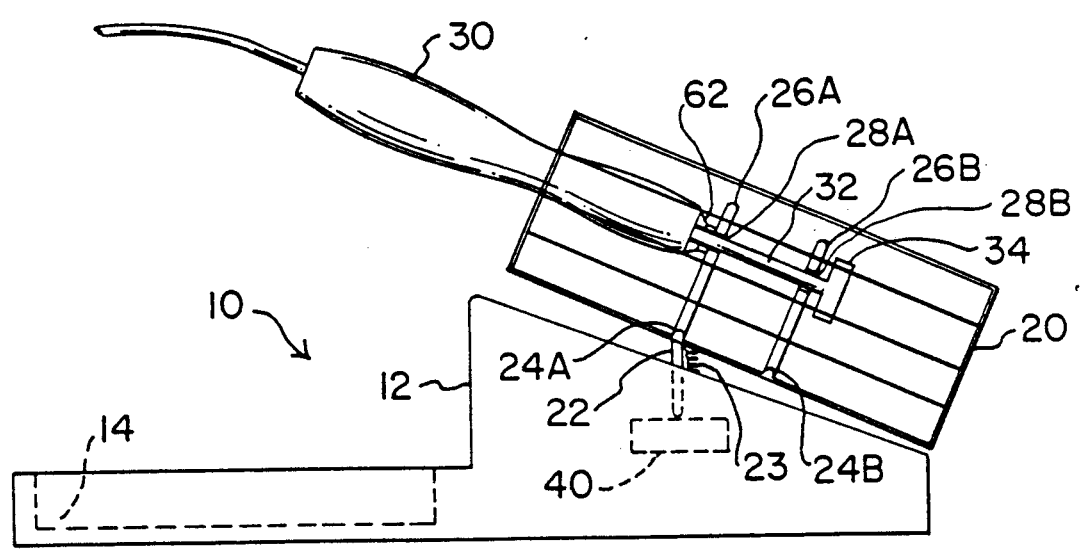
FIG. 2 is a side view of the soldering iron holder showing a soldering iron having a square tip inserted therein.

FIG. 2 shows a side view of the soldering iron holder 10. A soldering iron 30 is shown inserted into the shield 20 with a barrel 32 of the soldering iron 30 inserted into the brackets 26A and 26B. Because the brackets 26A and 26B are mounted left of the center of the shield 20 (see FIG. 1), the large tip 34 of the soldering iron 30 can be inserted into the right side of the shield 20. After insertion, the iron 30 is moved sideways to insert the barrel 32 into the slots 28A and 28B of the brackets 26A and 26B. When the soldering iron 30 is inserted into the slots 28A and 28B, the weight of the iron 30 depresses the shield 20 and the rod 22, which, in turn, depresses a weight switch 40 The weight switch 40, which is mounted to the base 12 using a conventional mounting bracket, is shown in dashed lines because it is located inside the base 12. A spring 23 biases the shield 20 upward to release the weight switch 40 when the iron is removed from the brackets 26A and 26B.

As an alternative to the spring 23, the shield 20 could be mounted to a hinge, with the other side of the hinge being mounted to the base 12. The bracket would be placed in the shield at a location that causes the shield to rotate when the iron is placed in the bracket. This rotation activates the switch 40. When the iron is removed from the bracket, the shield rotates in the opposite direction to deactivate the switch 40.

Figure 3:
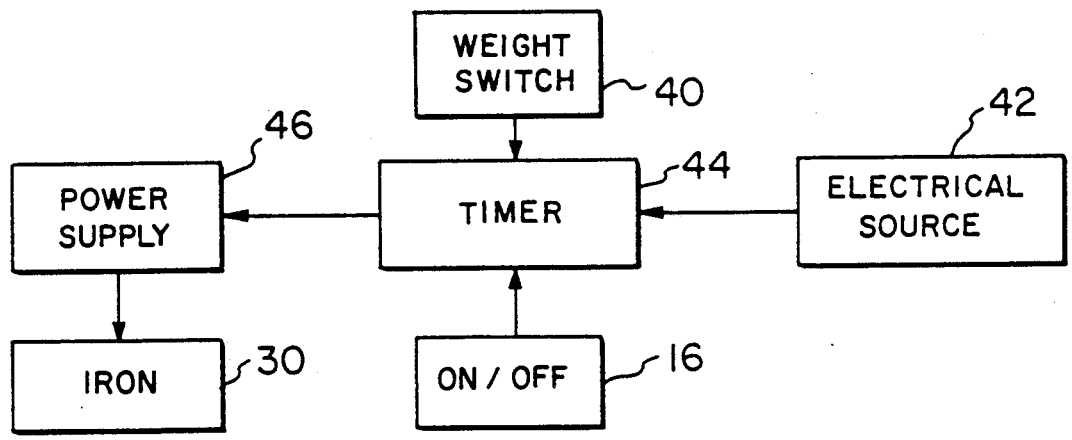
FIG. 3 is a block diagram of a timer circuit that removes power after the iron has not been used for a predetermined time.

FIG. 3 shows a circuit used to supply power to the soldering iron 30. An electrical source 42, which is a standard service outlet, supplies power to a timer 44. The switch 16, which is also shown in FIG. 1, controls the power from the source 42. In an alternative embodiment, the switch is located remotely from the base. When the switch 16 is turned on, the timer 44 is activated to allow the power supply 46 to power the soldering iron 30. Each time the iron 30 is removed from the shield 20, the weight switch 40 is released, which resets the timer. If the timer is not reset within a predetermined time, it will expire and disconnect the electrical source 42 from the power supply 46, turning off the iron.

Figure 4:
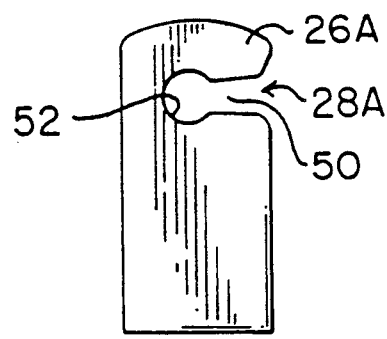
FIG. 4 is a view of the bracket and slot.

FIG. 4 shows a front view of the bracket 26A. Bracket 26B is identical is shape to bracket 26A. The slot 28A has an entrance 50 which is sufficiently wide to allow the barrel 32 (FIG. 2) be inserted therein. After moving through the entrance 50, the rod is seated in an opening 52 which is larger than the entrance 50. Since the opening 52 is larger than the entrance 50, the barrel of the iron will be prevented from falling out of the slot 28A.

Figure 5:
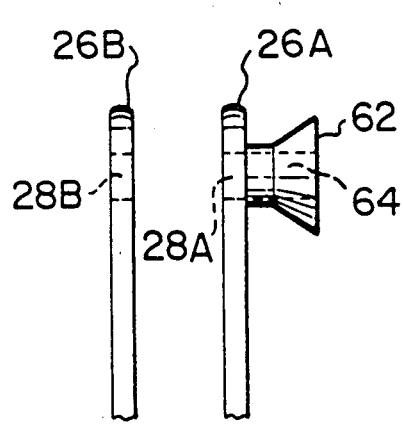
FIG. 5 is a side view of the two brackets showing a spring clip that facilitates insertion.

FIG. 5 shows a side view of a bracket 60. A spring clip 62 is attached to the bracket 60. The spring clip 62 has a funnel shaped opening 64 which guides the barrel of the soldering iron into a slot (not shown) in the bracket 60.

Figure 6:
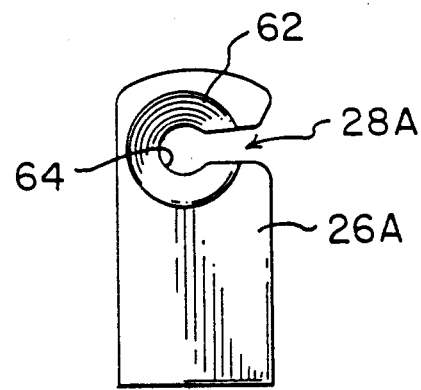
FIG. 6 is a front view of the bracket with the spring clip.

FIG. 6 shows a front view of the bracket 60 and shows that the spring clip 62 surrounds the slot in the bracket.

Having thus described a presently preferred embodiment of the present invention, it will now be appreciated that the objects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. A soldering iron holder for holding an electrically heated soldering iron having a barrel, a handle connected to one end of the barrel, and an enlarged soldering tip connected to an other end of the barrel, said holder comprising a substantially rectangular box-shaped housing;

hollow shield means mounted on said housing for shielding said iron, said shield means having a large opening in one surface, said large opening being sufficient to allow insertion of the barrel and enlarged tip;

a bracket mounted substantially vertical inside said hollow shield and attached to said shield;

a slot formed horizontally in a side of said bracket, said slot having a dimension sufficient to allow the barrel of the soldering iron to be inserted therein whereby said slot will receive and hole the barrel of the soldering iron and prevent the tip from contacting said shield thereby preventing said shield from sinking heat from the tip;

power supply means for supplying electrical power to said soldering iron to thereby heat the same;

means for detecting the presence of said iron in said bracket; and resettable timing means activated by the detection of the placement of the soldering iron barrel in said bracket by said detecting means for deactivating said power supply means a predetermined time after the barrel of the iron is placed in said slot of said bracket, said timing means being reset in response to the detection of the removal of the soldering iron from said bracket by said detecting means.

2. The soldering iron holder of claim 1 wherein said means for detecting comprises:

mounting means for movably mounting said shield on said housing, said mounting means allowing said shield to move vertically with respect to said housing;

bias means connected to bias said shield away from said housing; and switch means connected to said mounting means for detecting said vertical movement of said shield;

whereby the weight of the soldering iron causes said switch means to activate said timing means when said iron is placed in said bracket, and said bias means causes said switch means to reset said timing means when the iron is removed from said bracket.

3. The soldering iron holder of claim 2 wherein said mounting means is detachable from said housing to permit said shield to be removed from said base.

4. The soldering iron holder of claim 1 further comprising:

a second vertical bracket mounted inside said shield and attached to said shield behind said vertical bracket; and a second slot formed horizontally in a side of said second bracket, said second slot being of substantially the same dimension as said slot, and said second slot being aligned with said slot to allow the barrel of the soldering iron to be held in both sides simultaneously.

5. The soldering iron holder of claim 4 wherein said brackets are offset from a center of said large opening in said shield.

6. The soldering iron holder of claim 1 further comprising a spring clip having a hollow center attached to said bracket, said clip being located to allow said hollow center to align with said slot such that the barrel of the soldering iron will enter both said slot and said spring clip.

7. A soldering iron holder for holding an electric soldering iron having a barrel, a handle connected to one end of the barrel, and an enlarged soldering tip connected to an other end of the barrel, said holder comprising:

a substantially rectangular box-shaped housing;

hollow shield means mounted on said housing for shielding said iron, said shield means having a large opening in one surface, said large opening being sufficient to allow insertion of the barrel and enlarged tip;

a bracket mounted substantially vertical inside said hollow shield and attached to said shield;

a slot formed horizontally in a side of said bracket, said slot having a dimension sufficient to allow the barrel of the soldering iron to be inserted therein whereby said slot will laterally receive and hold the barrel of the soldering iron and prevent the tip from contacting said shield thereby preventing said shield from sinking heat from the tip; and power supply means for supplying electrical power to said soldering iron to thereby heat the same.

8. The soldering iron holder of claim 7 wherein said means for detecting comprises:

means for detecting the presence of said iron in said bracket;

resettable timing means activated by the detection of the placement of the soldering iron barrel in the bracket by said detecting means for deactivating said power supply means a predetermined time after the barrel of the iron is placed in said slot of said bracket, said timing means being reset in response to the detection of the removal of the soldering iron from the bracket by said detecting means;

mounting means for movably mounting said shield on said housing, said mounting means allowing said shield to move vertically with respect to said housing;

bias means connected to bias said shield away from said housing; and said detecting means comprising a switch means connected to said mounting means for detecting said vertical movement of said shield;

whereby the weight of the soldering iron causes said switch means to activate said timing means when said iron is placed in said bracket, and said bias means causes said switch means to reset said timing means when the iron is removed from said bracket.

9. The soldering iron holder of claim 8 wherein said mounting means is detachable from said housing to permit said shield to be removed from said base.

10. The soldering iron holder of claim 7 further comprising:

a second vertical bracket mounted inside said shield and attached to said shield behind said vertical bracket; and a second slot formed horizontally in a side of said second bracket, said second slot being of substantially the same dimension as said slot, and said second slot being aligned with said slot to allow the barrel of the soldering iron to be held in both slots simultaneously.

11. The soldering iron holder of claim 10 wherein said brackets are offset from a center of said large opening in said shield.

12. The soldering iron holder of claim 7 further comprising a spring clip having a hollow center attached to said bracket, said clip being located to allow said hollow center to align with said slot such that the barrel of the soldering iron will enter both said slot and said spring clip.

13. A soldering iron holder for holding an electric soldering iron having a barrel, a handle connected to one end of the barrel, and an enlarged soldering tip connected to an other end of the barrel, said holder comprising:

a substantially rectangular box-shaped housing;

hollow shield means mounted on said housing for shielding said iron, said shield means having a large opening in one surface, said large opening being sufficient to allow insertion of the barrel and enlarged tip;

a first bracket mounted substantially vertical inside said hollow shield and attached to said shield;

a first slot formed horizontally in a side of said first bracket, said first slot having a dimension sufficient to allow the barrel of the soldering iron to be inserted therein whereby said first slot will laterally receive and hold the barrel of the soldering iron and prevent the tip from contacting said shield thereby preventing said shield from sinking heat from the tip;

a second bracket mounted substantially vertical inside said shield and attached to said shield behind said first vertical bracket; and a second slot formed horizontally in a side of said second bracket, said second slot being of substantially the same dimension as said first slot, and said second slot being aligned with said first slot to allow the barrel of the soldering iron to be held in both slots simultaneously.

power supply means for supplying electrical power to said soldering iron to thereby heat the same.

14. The soldering iron holder of claim 13 wherein said means for detecting comprises:

means for detecting the presence of said iron in said bracket;

resettable timing means activated by the detection of the placement of the soldering iron barrel in the bracket by said detecting means for deactivating said power supply means a predetermined time after the barrel of the iron is placed in said slot of said bracket, said timing means being reset in response to the detection of the removal of the soldering iron from the bracket by said detecting means;

mounting means for movably mounting said shield on said housing, said mounting means allowing said shield to move vertically with respect to said housing;

bias means connected to bias said shield away from said housing; and said detecting means comprising a switch means connected to said mounting means for detecting said vertical movement of said shield;

whereby the weight of the soldering iron causes said switch means to activate said timing means when said iron is placed in said bracket, and said bias means causes said switch means to reset said timing means when the iron is removed from said bracket.

15. The solder ring iron holder of claim 14 wherein said mounting means is detachable from said housing to permit said shield to be removed from said base.

16. The soldering iron holder of claim 13 wherein said brackets are offset from a center of said large opening in said shield.

17. The soldering iron holder of claim 13 further comprising a spring clip having a hollow center attached to said bracket, said clip being located to allow said hollow center to align with said slot such that the barrel of the soldering iron will enter both said slot and said spring clip.

* * * * *